United States Patent [19]
Elliott et al.

[11] Patent Number: 5,392,425
[45] Date of Patent: Feb. 21, 1995

[54] CHANNEL-INITIATED RETRY AND UNIT CHECK FOR PERIPHERAL DEVICES

[75] Inventors: Joseph C. Elliott, Hopwell Junction; Kenneth R. Lynch, Rhinebeck, both of N.Y.; Martin W. Sachs, Westport, Conn.; John H. Sorg, Jr., Los Gatos, Calif.

[73] Assignee: International Business Machines Corporation, Armonk, N.Y.

[21] Appl. No.: 290,449

[22] Filed: Aug. 15, 1994

Related U.S. Application Data

[63] Continuation of Ser. No. 753,290, Aug. 30, 1991, abandoned.

[51] Int. Cl.⁶ ............................................. G06F 11/00
[52] U.S. Cl. .................................... 395/575; 371/12
[58] Field of Search ..................... 395/575; 371/12, 13

[56] References Cited

U.S. PATENT DOCUMENTS

| | | | |
|---|---|---|---|
| Re. 31,069 | 10/1982 | Chang | 371/10.2 X |
| 3,688,274 | 8/1972 | Cormier et al. | 340/172.5 |
| 3,704,363 | 11/1972 | Salmassy | 371/5.1 |
| 3,984,814 | 10/1976 | Bailey | 371/12 X |
| 4,209,809 | 6/1980 | Chang | 371/13 X |
| 4,688,221 | 8/1987 | Nakamura | 371/13 |

OTHER PUBLICATIONS

IBM Technical Disclosure Bulletin, vol. 33, No. 10B, Mar. 1991, pp. 287-297, Serial I/O Architecture Ordered-Set/Sequence Reception and Protocol for Managing Sequences.

Primary Examiner—Robert W. Beausoliel, Jr.
Assistant Examiner—Glenn Snyder
Attorney, Agent, or Firm—Floyd A. Gonzalez

[57] ABSTRACT

Retrying a command from a CCW in a data processing I/O system having a channel connected to a control unit in which the channel detects an error condition and requests the control unit to retry the current command of an I/O operation. The control unit then determines if the requested retry can be accomplished, and, if it can, sends a response back to the channel requesting the channel to initiate a retry. After receiving the response, the channel checks to determine if conditions are still present which allow a retry, and if they are, executes the current command to perform the retry. If the control unit determines that a retry cannot be accomplished, the control unit has the option to perform a unit check procedure. If the control unit determines that neither a retry nor a unit check can be accomplished, the control unit has the option to perform a selective reset function.

23 Claims, 5 Drawing Sheets

COMMAND

| IFI | DEVICE ADDRESS | DHF | COMMAND FLAGS | COMMAND | COUNT |
|---|---|---|---|---|---|
| 0 | 1 | 3 | 4 | 5 | 6    7 |

FIG. 3

STATUS

| IFI | DEVICE ADDRESS | DHF | STATUS FLAGS | STATUS | STATUS PARAMETER |
|---|---|---|---|---|---|
| 0 | 1 | 3 | 4 | 5 | 6    7 |

FIG. 4

DEVICE-LEVEL CONTROL

| IFI | DEVICE ADDRESS | DHF | CONTROL FUNCTION | CONTROL PARAMETERS |
|---|---|---|---|---|
| 0 | 1 | 3 | 4 | 5    7 |

FIG. 8

| RC | RU | RO | CONTROL-UNIT RESPONSE (CI=1 IN STATUS) |
|---|---|---|---|
| 0 | 0 | 0 | DEVICE-LEVEL ACK |
| 0 | 0 | 1 | DEVICE-LEVEL ACK OR STATUS W/WO RETRY |
| 0 | 1 | 0 | DEVICE-LEVEL ACK OR STATUS WO RETRY |
| 0 | 1 | 1 | DEVICE-LEVEL ACK* |
| 1 | 0 | 0 | DEVICE-LEVEL ACK OR STATUS W/WO RETRY |
| 1 | 0 | 1 | DEVICE-LEVEL ACK OR STATUS W/WO RETRY |
| 1 | 1 | 0 | DEVICE-LEVEL ACK OR STATUS W/WO RETRY |
| 1 | 1 | 1 | DEVICE-LEVEL ACK OR STATUS W RETRY* |
| *RU AND RO BITS BOTH SET TO ONES IS AN ERROR. | | | |

CHANNEL-INITIATED RETRY AND UNIT CHECK FOR PERIPHERAL DEVICES

This application is a continuation of application Ser. No. 07/755,290, filed Aug. 30, 1991, now abandoned.

FIELD OF THE INVENTION

The present invention relates to a channel for executing a series of control words for performing an input/output (I/O) operation with a control unit for peripheral devices of a data processing system, and more particularly to channel initiated requests for retrying the operation upon detection of an error at the channel during the I/O operation.

DESCRIPTION OF THE PRIOR ART

I/O devices provide for the communication of data to a data processing system or between data processing systems. Devices are controlled by a control unit which provides the logic necessary to operate and control the I/O device. The control unit responds to commands received from a data channel which controls the flow of information between the I/O devices and the main storage of the data processing system. The channel, in response to an instruction in the main program of the data processing system, fetches and executes a channel program independently of the central processing unit (CPU). The channel program is made up of commands called channel command words (CCWs). CCWs related to each other are chained together to perform operations with respect to a single device in a predetermined sequence. A CCW specifies the command to be executed, the storage area to or from which the data are to be transferred, and a count indicating the number of bytes of information to be transferred.

U.S. Pat. No. 3,688,274 issued Aug. 29, 1972 to Cormier et al. for Command Retry Control by Peripheral Devices discloses an input/output system in which certain commands, command chains, or command sequences may be made selectively retryable by means of a status byte and control sequence to allow the control unit to initiate retry of the current operation. In response to an error or non-error condition detected by the control unit, the control unit presents status information to the channel which causes the channel to retry the command.

SUMMARY OF THE INVENTION

In the present invention, the channel detects an error condition and requests the control unit to retry the current command of an I/O operation. The control unit then determines if the requested retry can be accomplished, and, if it can, sends a response back to the channel requesting the channel to initiate a retry. After receiving the response, the channel checks to determine if conditions are present which allow a retry, and if they are, executes the current command to perform the retry. If the control unit determines that a retry cannot be accomplished, the control unit has the option to perform a unit check procedure.

It is thus an object of the present invention to provide for retrying a command wherein the retry is initiated by an error detected by a channel in a data processing I/O system.

It is also an object of the present invention to provide in a data processing I/O system having a channel connected to a control unit, for retrying a command of an I/O operation wherein, if conditions at the control unit will not allow a retry to be performed, to decline the request for retry.

It is also an object of the present invention to provide in a data processing I/O system having a channel connected to a control unit, for retrying a command of an I/O operation wherein, if conditions at the control unit will not allow a retry to be performed, optionally allows the control unit to change the retry request to a unit check.

It is also an object of the present invention to provide in a data processing I/O system having a channel connected to a control unit, for the channel to request a unit check for an overrun condition in an I/O operation wherein, if conditions at the control unit will allow a retry to be performed, for the control unit to change the request for unit check for an overrun condition to a request for retry.

The foregoing and other objects, features and advantages of the invention will be apparent from the following more particular description of the preferred embodiment of the invention as illustrated in the drawings.

DESCRIPTION OF THE PREFERRED EMBODIMENT

Figure 1:
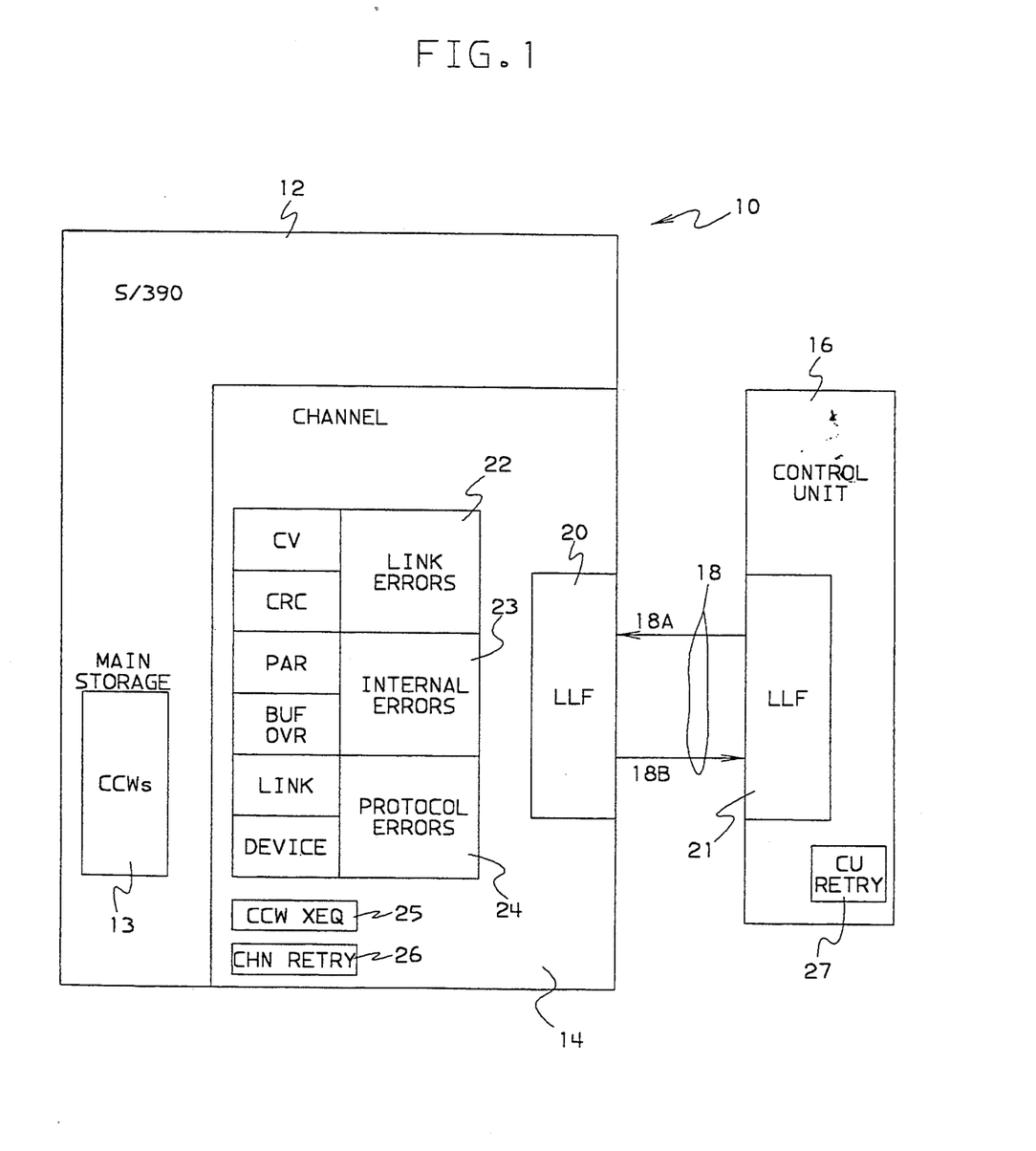
FIG. 1 is a block diagram of the I/O system of a data processing system having a channel, a control unit, and a communication link between the channel and the control unit.

FIG. 1 is an overall view of a data processing system 10 usable with the present invention. The data processing system 10 includes a computer 12 such as, for instance, an IBM System/390 computer, which further includes having at least one channel 14 having data input and output capabilities. The channel 14 is connected by a data link 18 to a control unit 16. In the preferred embodiment, the data link 18 includes an input conductor 18A providing for data transmissions from the control unit 16 to the channel 14, and an output conductor 18B which provides for data transmission from the channel 14 to the control unit 16. The control unit 16 may be a control unit controlling several peripheral devices, or a switch controller which, in conjunction with its associated switch elements, provides for switching the data link 18 to any one of a number of other control units or devices. It will be understood that the control unit 16 could be an I/O device. The control unit contains a control unit retry facility 27 which will be discussed in connection with FIG. 7. Channel commands are passed by the computer 12 to the channel 14 by a channel command word (CCW) in main storage 13 of the computer 12, in a manner well known in the art. Data and commands are sent between the channel 14 and the control unit 16 in accordance with protocols described in Serial I/O Architecture Ordered-Set/Sequence Reception and Protocol for Managing Sequences, IBM Technical Disclosure Bulletin, Vol. 33 No. 10b, March 1991, Pages 287–287. The channel 14 and the control unit 16 include link-level facilities (LLF) 20 and 21, respectively, which interface with the link 18 and send and receive serial frames and command sequences in accordance with these protocols the link-level facilities may be as disclosed in U.S. patent application Ser. No. 07/575,923 filed Aug. 31, 1990 for Managing a Serial Link in an I/O System, and may include means to generate command sequences as set forth in U.S. patent application Ser. No. 07/429,268 filed Oct. 30, 1989 for Transmitting Commands Over a Serial Link. A dynamic switch may be located between the channel 14 and the control unit 16 for allowing the channel 14 to make dynamic connections with a number of control units as set forth in U.S. patent application Ser. No. 07/429,267 filed Oct. 30, 1989 for Switch and its Protocol for Making Dynamic Connections. The channel 14 may be constructed in accordance with U.S. Pat. No. 5,025,458 issued Jun. 18, 1991 to Casper et al. for Apparatus for Decoding Frames From a Data Link, U.S. patent application Ser. No. 07/428,798 filed Oct. 30, 1989 for Apparatus for Constructing Data Frames for Transmission Over a Data Link, and U.S. patent application Ser. No. 07/481,071 filed Feb. 16, 1990 for System for High Speed Transfer of Data Frames Between a Channel and an I/O Device. All of the mentioned patents and patent applications are owned by the assignee of the present invention and are incorporated herein by reference.

The channel 14 is able to detect a number of error conditions such as link errors 22, internal errors 23, and protocol errors 24. Examples of link errors detected at 22 are code violation errors (CV) in the coded data received from the control unit 16 over the conductor 18A, and cyclic redundancy code (CRC) errors for detecting most frame errors that occur during transmission of a frame from the device link-level facility 21 to the channel link-level facility 20. Examples of internal errors detected by 23 are parity errors (PAR) wherein parity of data signals sent internally is incorrect, and buffer overflow (BUF OVR) errors which indicates an overflow of an internal buffer. Examples of protocol errors detected by 24 are errors which either indicates a violation of link level protocol or a violation of device level protocol. Detection of link and protocol errors are discussed in IBM publication SA22-7202-00 titled Enterprise Systems Architecture/390 Escon I/O Interface.

The channel 14 includes a CCW executing facility 25 to be discussed in connection with FIG. 5, and a channel retry facility 26 to be discussed in connection with FIG. 6.

Figure 2:
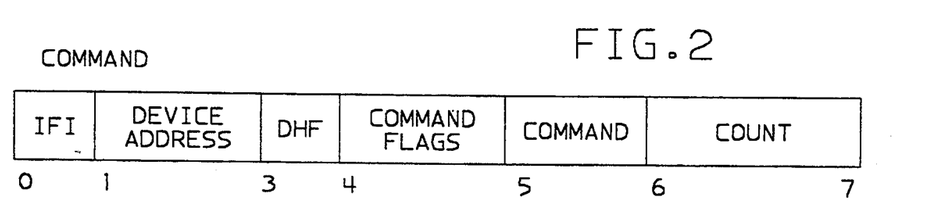
FIG. 2 shows a command frame sent from the channel to the control unit to perform I/O operations.

FIG. 2 is a diagram of a command frame which is used for the channel-to-control-unit transfer of information associated with the current CCW being executed. At the beginning of an I/O operation, a command frame is used to initiate the operation with an I/O device. The device header flag (DHF) field includes a chaining (CH) bit which, when set to one, is used by the channel to signal its intention to chain or to confirm that chaining is continuing. A DHF containing the CH bit is also present in the device-level control frame to be discussed in connection with FIG. 4. The CH bit is set to zero in frames sent by the control unit and is ignored in frames received by the channel.

For a command frame from the channel, the CH bit may be set to either one or zero. If the CH bit is set to one, the command frame is a command update as a result of either command chaining, data chaining, or command retry and the command-flag field and the count field contain information from the current CCW. Additionally, if the CH bit is set to one and the update is for command chaining, the command field indicates the command is from the new CCW. Whether the command update is for data chaining or command chaining depends on the command-flag bits of the previous command frame and is indicated by a DU bit in the command-flag field. The DU bit is set to zero when the command update is for a command retry. If the CH bit is set to zero, the command frame is not a command update. The CH bit is set to zero in all command frames initiating a channel program; if the CH bit is set to one for a command frame initiating a channel program, a device-level error is detected at the control unit. The CH bit is set to one in all remaining command frames or any command retry received during the execution of a channel program; if the CH bit is set to zero for a command frame after the first, chaining is terminated, and a device-level error is detected at the control unit.

For a device-level-control frame (see FIG. 4) from the channel, the CH bit may be set to one only for a status-accepted frame either during command chaining and the status does not include device end, or when the status represents a retry request for an I/O operation and the status does not include device end (to be discussed). The CH bit is set to one by the channel when chaining is still indicated for the I/O operation. The CH bit is set to zero when chaining is not or no longer indicated for the I/O operation or when a retry request in not accepted. The CH bit is set to zero for all control frames sent by the channel other than status accepted. The control unit ignores the CH bit for all device-level-control frames received other than status accepted.

Figure 3:
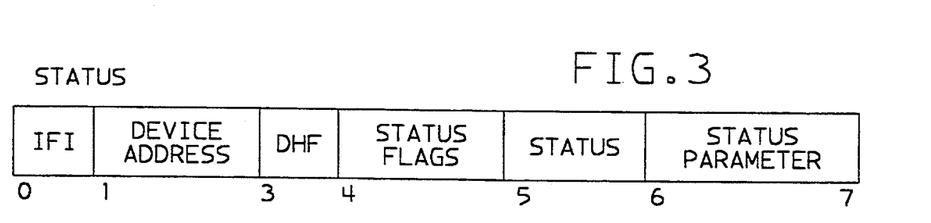
FIG. 3 shows a status frame sent from the control unit to the channel to communicate the status of the control unit/device to the channel.

FIG. 3 is a diagram of a status frame which is used to transfer status to a channel. A status frame may be sent as a result of a command frame as shown in FIG. 2 or a data frame, not shown. A Status Flag field is used to provide additional information to the channel concerning the conditions that were present in the control unit when status was generated. These flags assist the channel in determining how to handle the status frame and what status to report. The Status Flag field includes a Channel Initiated (CI) bit and a Command Retry (CR) bit.

The CI bit, when set to one, indicates that the status frame resulted from the identified I/O device having accepted a selective-reset frame (to be discussed), with either a request for retry or a request for unit check. If the CI bit is set to zero, the status frame is not a direct response to a selective-reset frame with a request for retry or a request for unit check.

A Status byte includes bits which indicates device and control unit status. The Status Byte includes a Status Modifier (SM) bit, a Channel End (CE) bit, a Device End (DE) bit, and a Unit Check (UC) bit.

A channel indicates acceptance of the status by means of either a status-accepted frame, or, when retry or chaining is performed and the status includes device end, by means of a command having the CH bit set to one.

SM status is generated by the device when the device cannot provide its current state in response to interrogation by the channel subsystem, when the control unit is busy, when the normal sequence of commands has to be modified, or when command retry is to be initiated.

CE status is presented when the data-transfer portion of an I/O operation is completed. Acceptance of channel-end status is considered to be the completion of the channel portion of the I/O operation.

DE status is presented to the channel (1) when the completion of an I/O operation is indicated by the I/O device, (2) when the I/O device, having previously responded busy, indicates that a transition from the busy to the not-busy state has occurred, (3) when the I/O device indicates that a change from the not-ready to the ready state has occurred, and (4) when the control unit or I/O device indicates that an asynchronous condition has been recognized.

UC status indicates that the I/O device or control unit has detected an unusual condition that is detailed by sense data. The occurrence of unit check may indicate that a programming error or an equipment error has been detected, that the not-ready state of the I/O device has affected the execution of the command, or that an exception condition other than the one identified by unit exception has occurred. The unit-check bit provides a summary indication of the conditions identified by sense data. The sense data is well understood in the I/O device and control unit art, and will not be discussed further.

The CR bit, when set to one, is used to request command retry if the status byte also contains retry status. If the CR bit is set to zero or the status byte does not contain retry status, command retry is not being requested. The status byte contains retry status if it contains unit check and status modifier together with 1) channel end alone (meaning the control unit or I/O device is not yet ready to retry the command), or 2) channel end and device end (meaning the control unit and I/O device are prepared for immediate command retry). All other status combinations are not considered retry status. Thus, if the CR bit is set to one with any of these other status combinations, a device-level error is detected at the channel.

Figure 4:
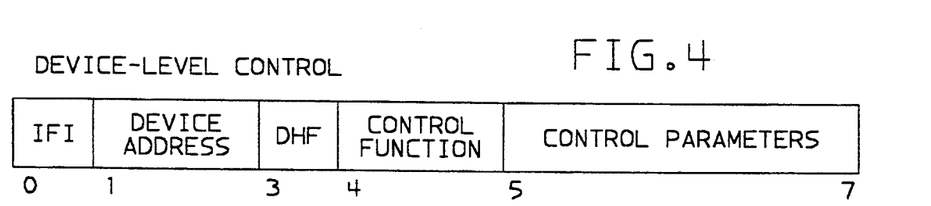
FIG. 4 shows a device-level control frame which, in the present invention, is used to send selective-reset frames from the channel to the control unit, each selective-reset frame having RC, RU, and RO bits.

FIG. 4 shows a device-level-control frame which is used by a channel or control unit to provide device-level control for an I/O operation. The control function byte of the device-level-control frame is interpreted in conjunction with bits in the device-header flag (DHF) field to determine the device-level function to be performed and the format of the control parameter field. One of the bit combinations of the control function byte identifies the device-level-control frame as a selective-reset frame.

The selective-reset frame causes the control unit to end execution of the current operation, if any, for the specified I/O device, and, depending on the bits within the control-parameter field, to request either channel-initiated retry or channel-initiated unit check, or, for a limited number of conditions to be discussed, to perform selective reset.

The control parameter field of the selective-reset frame contains a Request Command Retry (RC) bit, a Request Unit Check (RU) bit, and a Request Unit Check with Overrun (RO) bit. When the RC bit, RU bit, and RO bit are all set to zeros, a selective reset is performed.

When one or more of the RC, RU, and RO bits are set to ones and the requested function or functions cannot be performed, a selective reset is performed.

When the RC bit is set to one, a channel-initiated retry is performed, if possible; if retry is not possible, the RU bit and RO bit determine the preferred method of terminating the I/O operation.

When either the RU bit or the RO bit is set to one and channel-initiated retry is either not requested or requested and not performed, a channel-initiated unit check is performed, if possible; if channel-initiated unit check is not performed, a selective reset is performed.

A selective-reset frame is sent only by a channel; if a channel receives a selective-reset frame, a device-level error is detected.

The RC bit, when set to one, indicates that the channel is requesting the I/O device to perform command retry on behalf of the channel. If command retry cannot be performed, the RU and RO bits determine the action to be taken. If the RC bit is set to zero, the RU and RO bits determine the action to be taken.

The RU bit, when set to one, indicates that the channel is requesting the I/O device to terminate the I/O operation on behalf of the channel with unit-check status.

The RO bit, when set to one, indicates that the channel is requesting the I/O device to recognize an overrun condition and terminate the I/O operation on behalf of the channel with unit-check status.

The channel may set to one either the RO bit or the RU bit depending on the error condition. When command retry is either not requested or requested and not performed, the I/O device interprets the RU and RO bits as follows:

| RU | RO | |
|----|----|---|
| 0 | 0 | A selective reset is performed. |
| 0 | 1 | The I/O device recognizes an overrun condition and generates unit-check status with the appropriate sense data. Retry may be requested. |
| 1 | 0 | The I/O device recognizes a unit check and generates unit-check status with the appropriate sense data. |
| 1 | 1 | Error - the I/O device ignores the requested functions and performs a selective reset. |

Figure 5:
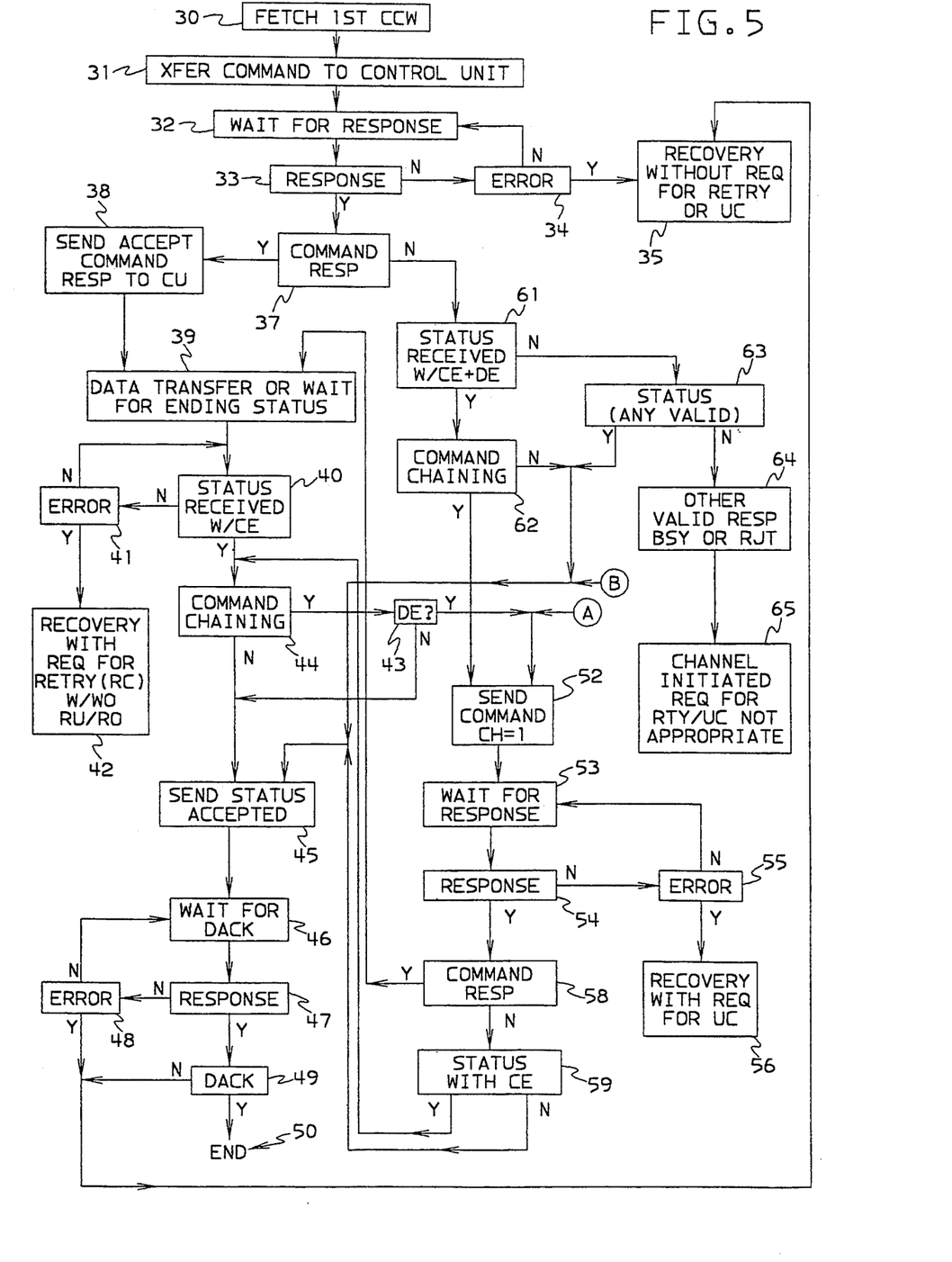
FIG. 5 is a flow diagram for the operation of the channel of FIG. 1.

FIG. 5 is a flow chart of the CCW executing facility of FIG. 1. FIG. 5 shows the operation of the channel 14 in which a retry operation is initiated. The operation of the channel 14 is started at 30 when the channel 14 fetches a CCW from the main storage 13. At 31, the command from the CCW is transferred to the control unit 16 to perform the I/O operation specified by the CCW as in the prior art. At 32, the channel 14 waits for a response from the control unit 16. At 33, the input from the control unit 16 is checked to see if a response to the command transferred at 31 has been received. If the input is not a response, the input is checked at 34 to see if there is an error in what has been received. In the present embodiment, the conductor 18A from the control unit 16 is kept in synchronism by idle characters limited control and information may be sent from the control unit 16 to the channel 14 by sequences of special characters, as explained in the previously mentioned patents and patent applications. At 34, such errors as code violations, sequence errors or partial frames may be detected. If no errors are detected, the channel goes to 32 to continue to wait for a response. If an error is detected at 34, the channel goes to 35 to initiate a recovery without request for retry or unit check. This procedure will be discussed starting at block 91 of FIG. 6.

Returning to 33, if a response is detected at 33, the channel goes to 37 to check if the response is a command response. This is one of the normal responses that the channel expects when it sends the command to the control unit. If the response detected is a command response, the channel goes to 38 wherein the channel 14 sends an accept command response to the control unit 16 to indicate that the control unit may proceed with the channel program. This is only done by the channel 14 for the first CCW. At 39, the channel 14 starts the data transfers, if any, and waits for ending status.

At 40, the channel checks the status received and checks for the expected status response with CE status. This means that at this point, the control unit/device no longer needs the services of the channel. If no response is received or a response other than status with CE is received at 40, a check is made at 41 to determine if an error has occurred. If no error is found at 41, the channel returns to 40 to wait for CE status. This status is transmitted by the control unit 16 to the channel 14 in a status frame as discussed in connection with FIG. 3.

If an error is detected at 41, the channel goes to 42 wherein the channel starts a recovery procedure with request for retry RC with or without RU and RO, as discussed in connection with FIG. 4. The errors being checked for may be any one of the errors being checked at 22, 23, and 24, that is, link errors, internal errors or protocol errors. A detection of an error at 41 means that the channel has detected an error before ending status has been recognized. In the recovery procedure at 42, the channel is permitted to request retry, and in addition to that, to request a unit check or to request unit check with an overrun condition. The procedure 42 is started at block 70 of FIG. 6. This procedure allows the channel to request the control unit to first retry, and also allows the control unit to report conditions if it cannot accomplish the retry, as will be discussed in connection with FIG. 6.

When the status frame is received with CE at 40, the channel checks for command chaining at 44. If the current CCW just completed contains a chaining bit, command chaining is specified. If command chaining is not in effect, the channel sends a status accepted frame to the control unit 16 at 45 with the CH bit set to zero, and waits for a device-level acknowledgement frame (DACK) at 46. At 47 the channel checks for a response similar to the check at 32. If an error is not detected at 48, the channel returns to 46 to continue to wait for a DACK. If an error is detected at 48, the channel goes to 35 to start recovery without a request for retry or unit check. If a response is detected at 47, the channel checks to see if the response is a DACK. If a response other than a DACK is detected at 49, the channel goes to the recovery procedure of 35. If the response detected at 49 is a DACK, the I/O operation is complete, and the channel goes to END at 50.

Returning to 44, if command chaining is in effect, the channel goes to 43 and determines if DE status is present with the DE status. If present, the channel fetches the next CCW from the main storage 13 and sends a command to the control unit 16 at 52 with the chaining bit CH set to one, as discussed in connection with FIG. 2, to start that new CCW. At 53, the channel waits for a response. Similar to 32, a check is made at 54 to determine if a response to the command sent at 52 has been received. A check is made at 55 to see if an error has occurred. If no error has occurred at 55, the channel returns to 53 to continue to wait for a response to the command sent at 52. If an error is detected at 55, the channel goes to a recovery procedure at 56 for a recovery with a request for unit check. This procedure starts at block 88 of FIG. 6. At this point, the channel has just sent a command for the next CCW, and it is possible that the error is caused because the control unit 16 never received the next command, did not send a response and timed out. At this point, the channel cannot know whether the control unit is on the same or a previous command as the channel. Thus, the channel cannot request a retry at 56, and instead requests a unit check to obtain the conditions at the control unit/device when the error at 55 was detected.

If a response is detected at 54, a check is made at 58 to determine if the response is a command response. If yes, the channel goes to 39 to start a data transfer for the chained CCW. If the response is not a command response, the channel goes to 59 to check if the response is a status frame with CE. If yes, the channel goes to 44 and continues as previously described. If no, the channel goes to 45 to send a status accepted frame with the CH bit set to one if command chaining is to be performed or with the CH bit set to zero if command chaining is not to be performed, as specified by the chaining bit in the current CCW.

Returning to 43, if DE status is not present with CE status, the control unit goes to 45 and sends a status accepted frame with the CH bit set to one As is well known, a disconnected chaining operation takes place after END 50.

Returning to 37, if the response at 37 was not a command response, the channel goes to 61 to determine if the response received is status with CE and DE. If yes, a check is made at 62 to see if chaining is in effect, similar to the check which was made at 44. If command chaining is in effect, the channel fetches the next CCW from main storage 13 and goes to 52 to execute that next CCW. If the response received at 61 is not status with CE and DE, the channel checks at 63 to see if any valid status has been received. If the status is valid at 63, the channel goes to 45 to send status accepted to the control unit 16, and continues as previously described.

If the result at 63 is no, this frame must be another valid response such as, for instance, Busy or Reject, as shown at 64, and a channel initiated request for retry or unit check is not appropriate as shown at 65. At 65, the channel takes appropriate action dependent on the response detected at 64, which action is beyond the scope of the present invention.

Figure 6:
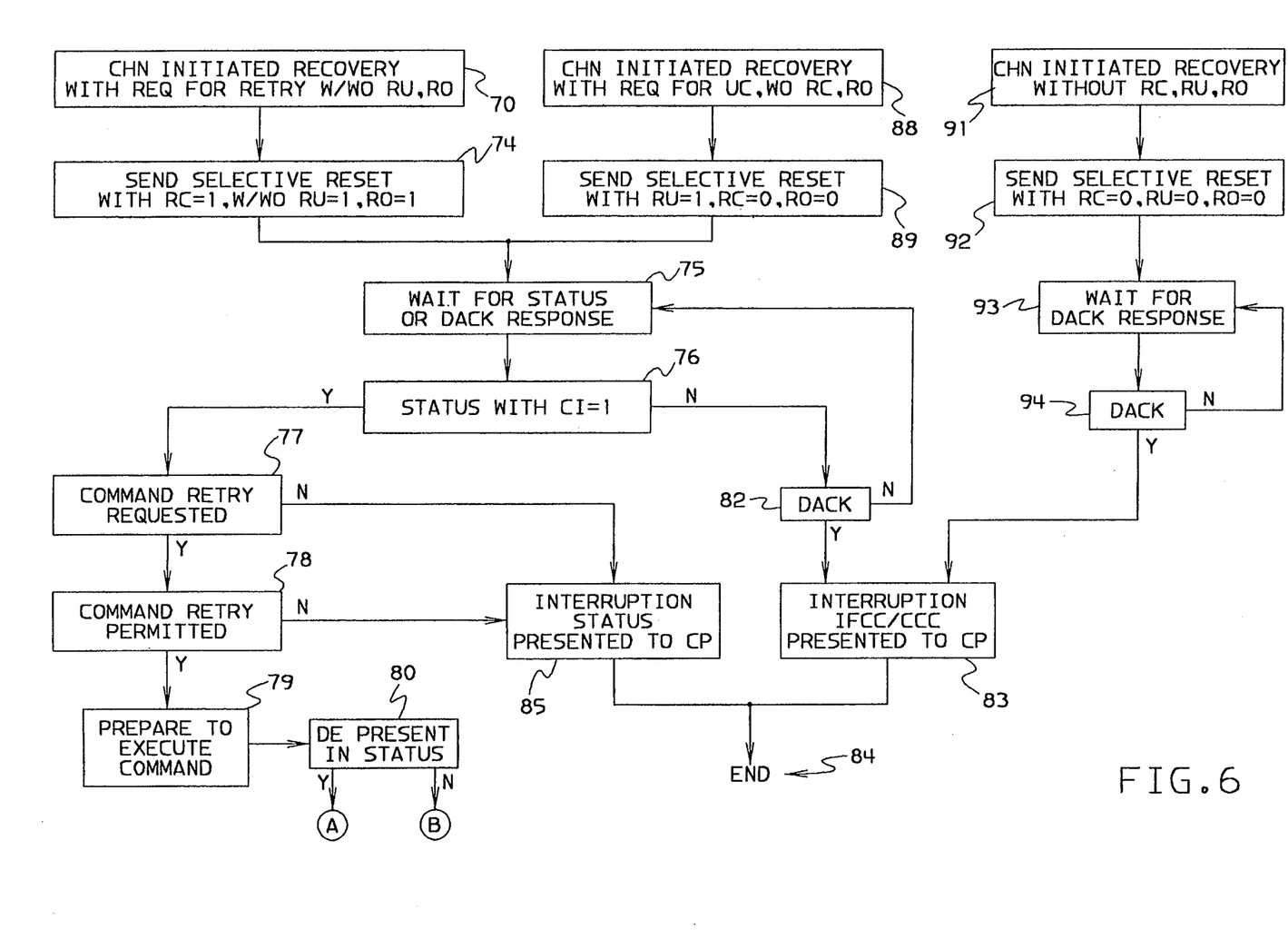
FIG. 6 is a flow diagram for a channel initiated recovery when the channel detects an error during its operation in accordance with the flow diagram of FIG. 5.

FIG. 6 is a flow chart of the channel retry facility 26 of FIG. 1. FIG. 6 shows the channel initiated recovery procedures called by the channel in the flow chart of FIG. 5. In block 42 of FIG. 5, the channel initiates recovery with a request for retry with or without RU and RO. Block 70 of FIG. 6 is the start of this recovery. At 74, a selective-reset device-level control frame as shown in FIG. 4 is sent by the channel 14 to the control unit 16. The selective-reset frame has the RC bit set to one, and, optionally, may have the RU and RO bits set to either ones or zeros, depending on the type of error and conditions present. For example, if the error condition is associated with insufficient buffering to handle the flow of data from the control unit 16 before being stored into main storage 13, the channel sets the RO bit to one. The RU bit may be used by the implementer, if desired, to request that the control unit perform a unit check in the event that the control unit determines that it cannot perform the retry requested by the channel.

At 75, the channel waits for a status frame or a DACK, depending on whether the control unit is able to request a retry at that time. It will be understood that the channel initiates the recovery and requests the control unit to retry, but it is the control unit which determines if it is able to retry the last command. At 76, the channel checks the response received to determine if the response is a status frame with the CI bit set to one. If yes, the channel at 77 determines if a command retry is being requested as determined by the status frame received at 75 containing a CR bit set to one End the status being a retry status, as previously defined. At this point, the channel has requested a retry, the control unit has accepted and sent back a status frame indicating the control unit is able to perform a retry. If the answer at 77 is yes, the channel goes to 78 to determine if a retry is permitted. At 78, the channel is checking its internal conditions to make sure that at this point in time, it is in fact able to do the retry. This is necessary because time has passed between the sending of the selective-reset frame at 74 and block 78. In this last check, the channel verifies that no condition has occurred in the time between 74 and 78 which would prevent a command from being retried. If yes, the channel goes to 79 to prepare to re-execute the command that is to be retried. If the check at 78 is no, it means that an internal condition is now such that a command retry is no longer permitted. In this case, the channel turns the retry request by the control unit into an interruption to the control program at 85, and ends at 84.

At 80, the channel checks the status received in the status frame at 76 to see if the DE bit is set to one. The DE bit set to one indicates that the device is ready to immediately accept the retry operation. If it is, the channel goes to block 52 of FIG. 5 to send the command to be retried to the control unit 16, and continues from there as previously discussed. If the check at 80 is no, the channel goes to block 45 of FIG. 5 and sends a status accepted frame to the control unit, and continues on from that point, as previously discussed. At this point, the channel performs a disconnected chaining operation.

If the answer at 76 is no, the response received at 75 is checked at 82 to see if it is a DACK. If no, the channel returns to 75 to continue to wait for a response. If it is a DACK, the channel at 83 presents an interface control check or a channel control check to the control program (CP) of the computer 12 depending on the initial error condition that initiated the channel request for retry or the request for unit check procedure, and raises an interrupt. If a DACK is received at 75, this means that the control unit has refused the channel's request for retry or unit check requested at 74. The control unit is thus at a state where it cannot help the channel in recovery. At this point the channel can only turn the error it detected into an interface control check or channel control check. Such control checks are known, and will not be discussed further.

After 83, the channel goes to END at 84, which ends the channel program.

Returning to 77, if the answer at 77 is no it means that the control unit could not perform retry but could accept the request for unit check, thus electing to turn the request into a unit check by returning a status frame with the CR bit equal to zero. In this case, the channel goes to 85 wherein an interruption is presented to the control program. The channel then goes to END at 84.

The recovery procedure starting at 88 is called at block 56 of FIG. 5. This procedure is for a channel initiated recovery with a request for UC without RC or RO. At 89, the channel 14 sends a selective-reset frame to the control unit 16. The selective-reset frame has the RU bit set to one and the RC and RO bits equal to zeros. The channel then goes to 75 to wait for a status or DACK, and continues as previously discussed.

The recovery procedure starting at 91 is called at block 35 of FIG. 5. This procedure is for a channel initiated recovery without RC, RU, or RO. At 92, the channel sends a selective-reset frame to the control unit with the RC, RU, and RO bits equal to zeros since a request for retry or unit check is not appropriate. At 93 the channel waits for a DACK response from the control unit. Since the only acceptable response is a DACK, the channel 94 checks to see if the response is a DACK. If the response is not a DACK, the channel returns to 93 to wait. If the response is a DACK, the channel goes to 83 to generate an I/O interruption for either an interface control check or a channel control check, and goes to END at 84.

Figure 7:
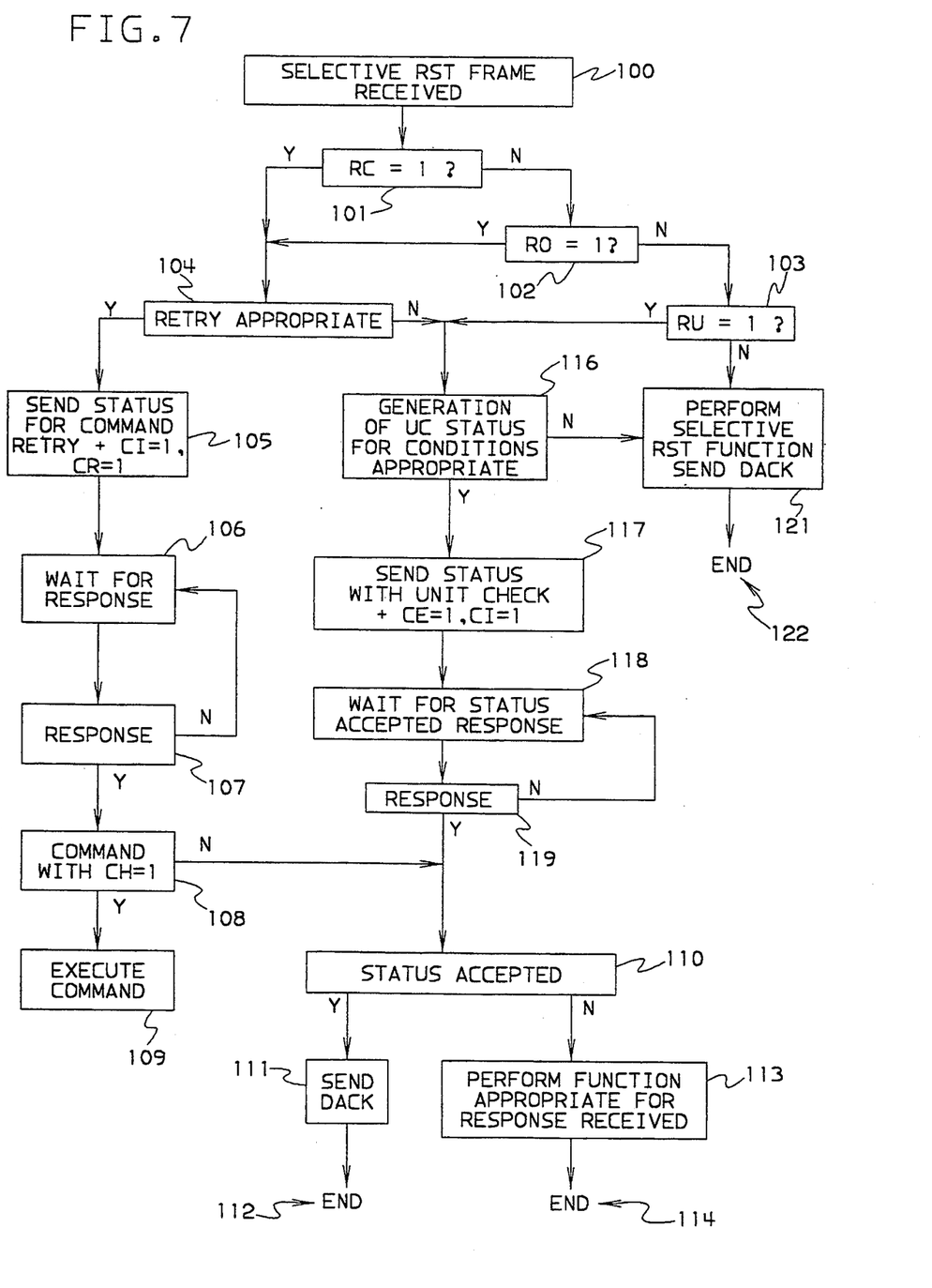
FIG. 7 is a flow diagram for the operation of the control unit of FIG. 1 in response to a selective-reset frame sent by the channel in accordance with the flow chart of FIG. 6.

FIG. 7 is a flow chart of the control unit retry facility 27 of FIG. 1. FIG. 7 shows the operation of the control unit 16 upon receipt of the selective-reset frame sent from the channel 14 at one of the blocks 74, 89, or 92 of FIG. 6. At 100, the selective-reset frame is received by the control unit 16. The checks at 101, 102 and 103 provide the logic to determine which of the bits RC, RO, and RU are set to ones.

If either the RC bit or the RO bit are ones, the control unit goes to 104 where a check is made to see if a retry is appropriate. Such a condition would be, for instance, if the device can be repositioned to the point prior to the start of execution of the current command. If the retry is appropriate, the control unit sends a status frame 105 with the CR bit and the CI bit both set to ones along with the described retry status. In this way, the control unit tells the channel to initiate a retry as a result of a retry request from the channel. At 106, the control unit waits for a response to its status frame. At 107, the control unit checks to see if what is received is a response to the status frame sent at 105. If it is not, the control unit returns to 106 to wait. If a response is received, the control unit checks at 108 to see if the response is a command frame with the CH bit set to one to indicate that the command is the requested retry. As discussed at 52 of FIG. 5, when the channel sends a command to be retried, the CH bit is set to one. If CH is equal to one, the command is executed at 109 such that the command is retried.

If the response at 108 is not a command frame with the CH bit set to one, the control unit goes to 110 to determine if the frame received at 106 is a status accepted frame. If yes, the control unit goes to 111 to send a DACK, and ends the channel program at END 112 as understood in the IBM ESA/390 architecture. If the frame received is determined at 110 to not be a status accepted frame, the control unit goes to 113 to perform the function appropriate for the response received at 106 and then goes to end at 114. These frames may be error or non-error type of frames, and are not within the scope of the present invention.

If it is determined that a retry is not appropriate, or if the RU bit is equal to one as determined at 103, the control unit goes to 116 where a check is made to see if it is appropriate to generate unit check status for the conditions present at the control unit/device.

If unit check status is appropriate, a status frame is sent at 117 to the channel with the UC, CE, and CI bits set to ones. At 118, the control unit waits to receive a status-accepted frame from the channel. At 119, the input is checked to determine if a response has been received. If not, the control unit returns to 118 to wait for a response. If a response is received at 119, the control unit goes to 110 to determine if the response is a status-accepted frame, and continues as discussed.

If the RU bit at 103 is not a one, or the generation of status is not appropriate, the control unit goes to 121 to perform a selective reset function and to send a DACK. The selective reset function is well understood in the art, and will not be discussed further. After the selective reset function is performed, the control unit goes to END 122.

Figure 8:
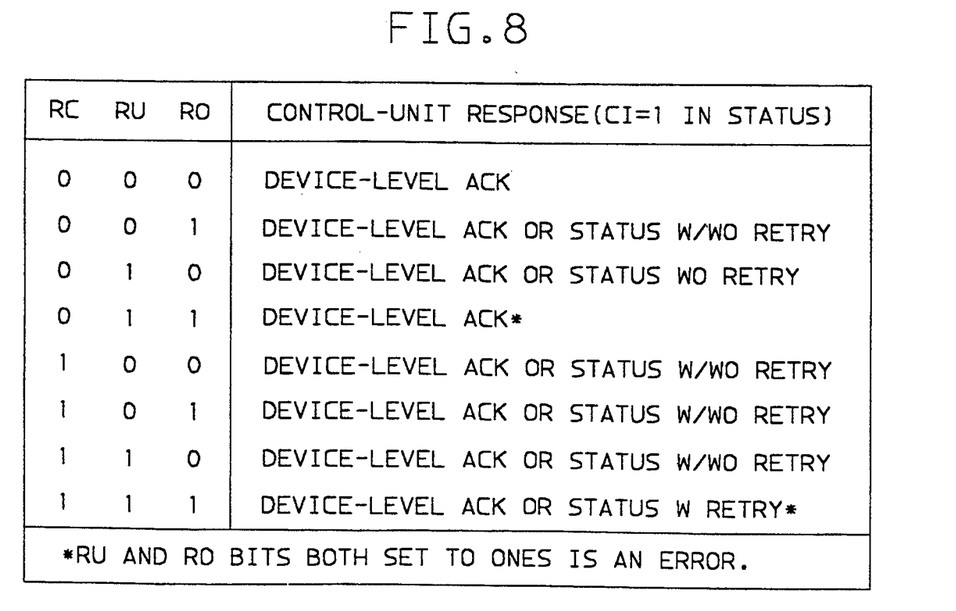
FIG. 8 is a chart which is a summary of the actions of the control unit depending of the values of the RC, RU, and RO bits sent in the selective-reset frame.

FIG. 8 is a chart which is a summary of the control unit response, depending on the values of the RC, RU, and RO bits.

While we have illustrated and described the preferred embodiment of our invention, it is to be understood that we do not limit ourselves to the precise construction herein disclosed, and the right is reserved to all changes and modifications coming within the scope of the invention as defined in the appended claims.

Having thus described our invention, what we claim as new, and desire to secure by Letters Patent is:

1. A data processing system comprising:
   a storage having a series of input/output channel command words (CCWs) stored in sequential locations therein;
   a channel for transferring commands and data between said storage and a connected control unit controlling at least one I/O device, said channel having a CCW executing means for executing commands in at least some of said CCWs for performing an input/output operation with said connected control unit, a command generating means for sending commands to said connected control unit, and a control frame generating means for sending device level control frames to said control unit;
   error detecting means in said CCW executing means for detecting errors during said input/output operation;
   channel retry means in said control frame generating means sending a request in said device level control frame from said channel to the connected control unit for requesting that the command in the current CCW be retried responsive to the detection of an error by said error detecting means; and
   re-executing means in said channel retry means for re-executing the command in the current CCW responsive to a response from said control unit to said channel wherein said response requests the retrying of the command from the current CCW.

2. The data processing system of claim 1 wherein said error detecting means includes means for detecting at least one of link errors, internal errors and protocol errors.

3. The data processing system of claim 1 wherein said channel retry means includes command permitted determining means for determining if conditions of said data processing system permit the execution of the command from said current CCW subsequent to the receipt of said response from said control unit.

4. The data processing system of claim 1 wherein said channel retry means includes means for sending an RU bit in said request wherein said RU bit requests the control unit to perform a unit check.

5. The data processing system of claim 4 wherein said channel retry means includes means for sending an RO bit in said request wherein said RO bit requests the control unit to perform a unit check for an overrun condition.

6. A control unit for use in a data processing system having a channel for transferring commands in a command frame, requests in a device level control frame and data to the control unit, said control unit comprising:
   receiving means for receiving commands in said command frame and requests in said device level control frame sent from the channel to the control unit;
   control unit retry means connected to said receiving means for detecting a request from the channel in said device level control frame to retry the current command;
   condition determining means in said retry means for determining if conditions are appropriate to retry the current command received in a previous command frame; and
   status sending means for sending a status to the channel responsive to said condition determining means, said status requesting that the current command be retried when conditions are appropriate for retry.

7. The control unit of claim 6 further comprising request changing means in said control unit retry means for changing a request for retry from the channel to a request for unit check if said condition determining means determines that conditions are not appropriate for retry.

8. The control unit of claim 7 wherein said control unit retry means further includes means of detecting a request for either retry or unit check, and said request changing means changes the detected request for either retry or unit check from the channel to a selective reset function if said condition determining means determines that condition are not appropriate for either of said requested retry or unit check.

9. The control unit of claim 7 wherein said control unit retry means further includes means for detecting a request for unit check for an overrun condition without retry, and said request changing means changes said request for unit check for an overrun condition without retry to a request for retry when said condition determining means determines that conditions are appropriate for retry.

10. A data processing system comprising:
    a storage having a series of input/output channel command words (CCWs) stored in sequential locations therein;
    a control unit for controlling at least one I/O device;

a channel connected to said storage and said control unit for transferring commands in command frames, requests in device level control frames and data between said storage and said control unit, said channel having a CCW executing means for executing commands in at least some of said CCWs for performing an input/output operation with said control unit;

error detecting means in said CCW executing means for detecting errors during said input/output operation;

channel retry means in said channel having sending means for sending a request in one of said device level control frames from said channel to said control unit for requesting that the command in the current CCW be retried responsive to the detection of an error by said error detecting means;

receiving means in said control unit for receiving commands in said command frames and requests in said device level control frames sent from said channel to said control unit;

control unit retry means connected to said receiving means for detecting a request sent from the channel to the control unit in one of said device level control frames to retry the current command received by the control unit in a previous command frame;

condition determining means in said control unit retry means for determining if conditions are appropriate to retry the current command;

status sending means connected to said condition determining means for sending a status from said control unit to the channel responsive to said condition determining means, said status requesting that the current command be retried when conditions are appropriate for retry; and re-executing means in said channel retry means for re-executing the command in the current CCW responsive to said status from said control unit to said channel wherein said status requests the retrying of the command from the current CCW.

11. The data processing system of claim 10 wherein said error detecting means includes means for detecting at least one of link errors, internal errors and protocol errors.

12. The data processing system of claim 10 wherein said channel retry means includes command permitted determining means for determining if conditions of said data processing system permit the execution of the command from said current CCW subsequent to the receipt of said response from said control unit.

13. The data processing system of claim 10 wherein said channel retry means includes means for sending an RU bit in said request wherein said RU bit requests the control unit to perform a unit check.

14. The data processing system of claim 13 wherein said channel retry means includes means for sending an RO bit in said request wherein said RO bit requests the control unit to perform a unit check for an overrun condition.

15. The data processing system of claim 13 further comprising request changing means in said control unit retry means for changing a request for retry from the channel to a request for unit check if said conditions determining means determines that conditions are not appropriate for retry and said RU bit is present in said request.

16. The data processing system of claim 15 wherein:

said channel retry means further includes means for sending a request for unit check without retry to said control unit; and said request changing means changes said request for unit check without retry to a request for retry when said condition determining means determines that conditions are appropriate for retry.

17. In a data processing system having a storage, a control unit controlling at least one I/O device, and a channel for transferring data, commands in command frames and requests in device level control frames between the storage and the control unit, a method of retrying a current command comprising:

storing a series of input/output channel command words (CCWs) in sequential locations in said storage;

providing for controlling at least one I/O device with said control unit in accordance with commands in said CCW;

transferring commands in said command frames, requests in said device level control frames, and data between said storage and said control unit, the request being common to any I/O device controlled by said control unit;

executing commands in at least some of said CCWs by said channel for performing an input/output operation with said control unit;

detecting errors with an error detecting means is said channel during said input/output operation;

sending a request in one of said device level control frames from said channel to said control unit for requesting that the command in the current CCW be retried responsive to the detection of an error by said error detecting means;

detecting by a detecting means in said control unit said request in one of said device level control frames from the channel;

determining by a conditioning determining means in said control unit if conditions are appropriate to retry the current command;

sending a status to the channel from the control unit responsive to said condition determining means, said status requesting that the current command be retried by said channel when conditions are appropriate for retry; and re-executing the command in the current CCW by said channel responsive to said status.

18. The method of claim 17 wherein said error detecting includes detecting at least one of link errors, internal errors and protocol errors.

19. The method of claim 17 further comprising, prior to re-executing said command in the current CCW, determining if conditions of said data processing system permit the execution of the command from said current CCW subsequent to the receipt of said status from said control unit.

20. The method of claim 17 wherein said sending of said request includes sending an RU bit in said request wherein said RU bit requests the control unit to perform a unit check.

21. The data processing system of claim 20 wherein said sending of said request further includes sending an RO bit in said request wherein said RO bit requests the control unit to perform a unit check for an overrun condition.

22. The method of claim 20 further comprising at the control unit, changing a request for retry from the channel to a request for unit check if said condition determining means determines that conditions are not appropriate for retry and said RU bit is present in said request.

23. The method of claim 17 wherein said sending a request includes sending a request for unit check without retry to said control unit, and further comprising:

detecting at said control unit said request for unit check without retry; and changing said request for unit check without retry to a request for retry when said condition determining means determines that conditions are appropriate for retry.

* * * * *